No. 847,790. PATENTED MAR. 19, 1907.
L. LARSEN.
DRILL CHUCK.
APPLICATION FILED JUNE 25, 1906.
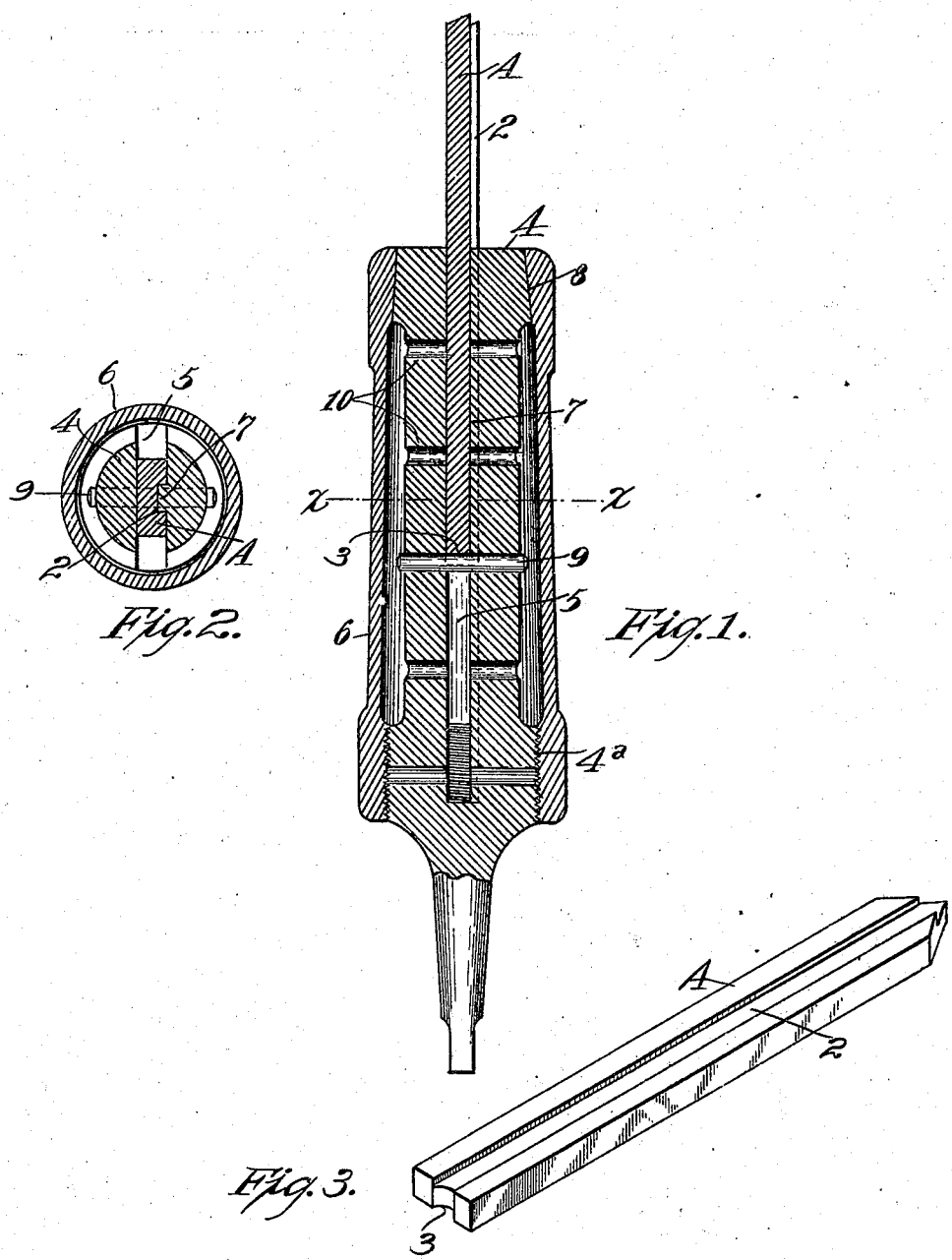
WITNESSES:
INVENTOR
Laurits Larsen
BY
Geo. H. Strong
ATTORNEY

UNITED STATES PATENT OFFICE.

LAURITS LARSEN, OF SAN FRANCISCO, CALIFORNIA.

DRILL-CHUCK.

No. 847,790.      Specification of Letters Patent.      Patented March 19, 1907.

Application filed June 25, 1906. Serial No. 323,335.

*To all whom it may concern:*

Be it known that I, LAURITS LARSEN, a citizen of the United States, residing at the city and county of San Francisco and State of California, have invented new and useful Improvements in Drill-Chucks, of which the following is a specification.

My invention relates to an improved drill and chuck or holder within which it is adjustably secured.

It consists of a combination of parts and details of construction which will be more fully explained by reference to the accompanying drawings, in which—

Figure 1 is a longitudinal section showing the drill in position. Fig. 2 is a transverse section taken on line $x\,x$ of Fig. 1. Fig. 3 is a perspective view of the drill.

It is the object of my invention to provide a flat drill and a chuck in which it can be suitably held, with means by which the drill can be advanced as fast as it is worn by use and grinding.

A drill of this description is shown at A. It has a groove or channel made on one side, as at 2, said groove or channel extending lengthwise of the drill. The front or operating end of the drill is ground to a bevel in the usual manner, as shown. At the rear end of the drill is a transversely-formed concaved groove 3.

The chuck consists of an inner section 4 having a slot or channel made through it from one side to the other, as shown at 5, Fig. 2. The length of the slot is such that the outer end of this portion of the chuck may be compressed and caused to lock or bind upon the drill-shank as follows: 6 is a sleeve having interior screw-threads, and this sleeve may be advanced over the part 4 by engaging the similar threads on the base of 4, such threads being shown at $4^a$. One of the segments of this part 4 has a tongue or feather 7, and this tongue or feather fits the corresponding groove 2 in the drill. The outer end of the part 4 is slightly tapered, as shown at 8, and the corresponding end of the sleeve 6 being also tapered it will be seen that when the sleeve is screwed down upon the threads $4^a$ the tapered interior drawing against the tapered exterior of the part 4 will compress this slotted portion of the part 4 upon the drill, which is thus firmly clamped between the two parts of 4. The tongue and groove serve to maintain it in place and in an absolutely straight line with the axis of the apparatus, and the bore to be made. Holes 10 are made through the part 4, as shown, and a pin 9 may be passed through any one of the holes, so that when the drill is inserted its rear end, having the concaved groove 3, will rest against the pin.

When the drill is new and has considerable length, the pin will be placed in the lowermost or rearmost portion of the openings 10. When the drill becomes worn by grinding, so as to be too short for this adjustment, the pin may be removed and inserted into another of the holes nearer to the end of the chuck from which the drill projects. Thus the pin may be moved farther up at intervals as the drill is worn until the drill is approximately worn out and a firm solid support is thus given to the base of the drill at all times, and it is prevented from being pushed back by a rapid feed when at work or by hard material upon which it might be operated.

Having thus described my invention, what I claim, and desire to secure by Letters Patent, is—

1. A chuck consisting of a cylindrical centrally-slotted inner portion having holes made transversely therethrough, and a pin transferable to different holes, said pin serving as a base upon which the end of a drill rests and an exterior sleeve by which the inner portion is clamped upon the drill.

2. A chuck comprising a slotted central portion having transverse holes, and a pin upon which the rear end of a drill is supported, said slotted portion having a tongue adapted to engage a groove in the drill, and an exterior clamping-sleeve.

3. A chuck comprising an exterior sleeve having a portion tapered, and another portion screw-threaded, an interior portion also tapered and screw-threaded and having a longitudinally-disposed channel with a tongue fitting a groove in a drill, said central portion being compressed to clamp the drill by turning it within the exterior sleeve, said portion having holes made transversely therethrough, and a pin changeable in said holes to form a support for the base of the drill.

In testimony whereof I have hereunto set my hand in presence of two subscribing witnesses.

LAURITS LARSEN.

Witnesses:
   JAMES H. THRANE,
   C. R. THRANE.